Figure 1:
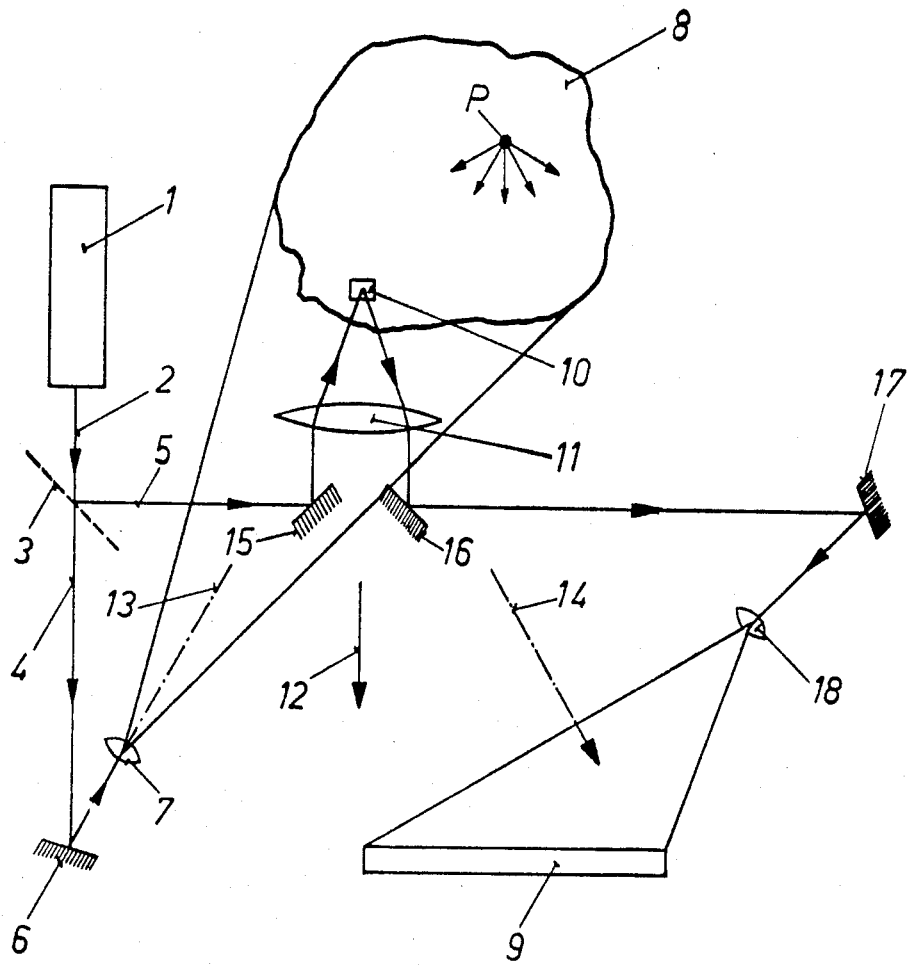

Mottier

[15] 3,661,437
[45] May 9, 1972

[54] METHOD FOR PRODUCING HOLOGRAMS OF MOVING OBJECTS

[72] Inventor: Francois Mottier, Zurich, Switzerland

[73] Assignee: Aktiengesellschaft Brown, Boveri & Cie, Baden, Switzerland

[22] Filed: June 22, 1970

[21] Appl. No.: 48,177

[30] Foreign Application Priority Data

July 2, 1969 Switzerland ..........................10120/69

[52] U.S. Cl.............................................................350/3.5
[51] Int. Cl. ........................................................G02b 27/22
[58] Field of Search......................................................350/3.5

[56] References Cited

OTHER PUBLICATIONS

Corcoran et al., 5 Applied Optics 668– 669 (4/1966)

*Primary Examiner*—David Schonberg
*Assistant Examiner*—Robert L. Sherman
*Attorney*—Pierce, Scheffler & Parker

[57] ABSTRACT

In the method of producing a hologram for an object in which a beam illuminating the object and a reference beam produced by the same light source establish the hologram by interference in a hologram plate between the reference beam and light coming from the object, any inadvertent movement of the object during the exposure time is compensated out by conducting one of the beams over a reflecting surface in the form of a small mirror located on the object in such manner that the difference between the mean path lengths of the rays of the object illuminating beam and of the light from the object to the hologram plate on the one hand, and that of the reference beam on the other hand, remains substantially constant.

3 Claims, 2 Drawing Figures ad# METHOD FOR PRODUCING HOLOGRAMS OF MOVING OBJECTS This invention relates to a method for the production of holograms of moving objects where a beam illuminating the object and a reference beam are produced by the same light source, the reference beam interfering in a hologram plate with the object light for the formation of the hologram.

The production of holograms was made possible in practice only by the use of so-called continuous line lasers for the production of mono-chromatic beams. According to the present state of technology, an extremely high stability of the optical structure is required. During the exposure time for taking the hologram, which can vary between 0.1 second and several minutes, the movements of the holographed object relative to the holograph device must not exceed one-eighth of the wavelength of the laser light used, which corresponds to a distance of 0.1 to 0.2 $\mu$.

But such a stable structure for the object can frequently not be realized. This is the case, for example, when the holographed object is too big to be housed with the holograph device in the same vibration-free tank or when the object or parts thereof are subjected to a creeping movement, for example, due to heat expansion.

The invention is based on the problem of providing a method for the production of holograms where movements of the object during the exposure are possible which are substantially greater than one-eighth of the wavelength of the laser light used.

The method according to the invention is characterized by the fact that, in order to compensate the effect of movement of the object, the illuminating beam or the reference beam are so conducted over a reflecting surface connected with the object that the difference of the mean path lengths of the rays of the illuminating beam and of the object light, on the one hand, and of that of the reference beam, on the other hand, remains at least substantially constant during the exposure.

Figure 2:
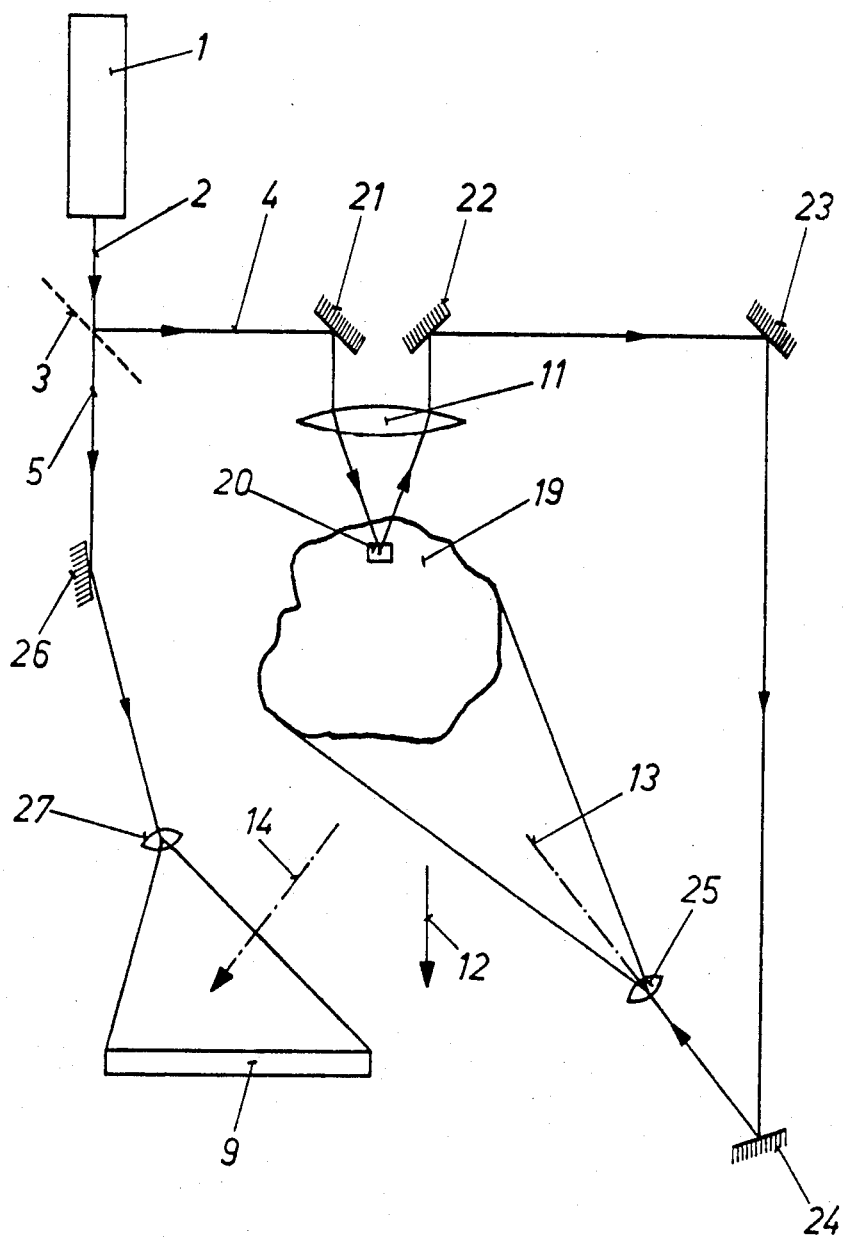

The invention will be described more fully on the basis of the accompanying drawing in which FIGS. 1 and 2 illustrate two different embodiments in a schematic manner.

With reference now to the drawings, FIG. 1 shows a holograph device as well as the object to be holographed in a schematic representation. A continuous line laser 1 emits a coherent monochromatic beam 2 which is split in a divider plate 3 into an illuminating beam 4 and a reference beam 5. The illuminating beam 4, which is deflected on a mirror 6 and fanned out in a microscope objective 7, serves to illuminate the object 8 which, as illustrated, is of arbitrary shape and reflecting quality. Each point P of the object reflects the impinging rays of the illuminating beam substantially diffuse as object light.

In order to compensate the effect of the movement of the object, the reference beam 5 is so conducted in this variant over a mirrored surface connected with the object that the difference of the mean path lengths of the rays of the illuminating beam and of the object light, on the one hand, and of that of the reference beam, on the other hand, remains substantially constant. To this end a very small mirror 10 is arranged on the side of the object 8 facing the hologram plate 9, ahead of which is arranged a collecting lens 11 whose axis is parallel to the angle bisector 12 between the axis 13 of the fanned-out illuminating beam and the mean direction 14 of the rays of the object light striking the hologram plate 9.

The reference beam 5 split off in the divider plate 3 is deflected on a mirror 15 in the direction of the object 8 and focussed by means of the collecting lens 11 on the mirror 10. This beam is now reflected on the mirror 10 and collimated again in the same collecting lens 11 and finally fanned out after double deflection on the mirrors 16 and 17 by means of a second microscope objective 18. The rays of the fanned-out reference beam interfere as usual in the hologram plate 9 with the rays of the object light for the formation of the hologram.

Due to this measure, the variation of the mean path length of the rays of the illuminating beam and of the object light during a movement of the object 8 in the direction of the above mentioned angle bisector 12 is at least substantially equal to the mean path length of the rays of the reference beam so that the relative phase position of the rays interfering in the hologram plate 9 is to a great extend independent of the movement of the object and the hologram is therefore little influenced by this movement.

According to a second advantageous variant of the method according to the invention the illuminating beam is conducted over a reflecting surface connected with the object. The arrangement used in this variant is shown in FIG. 2.

The coherent monochromatic beam 2 is split in a divider plate 3, similar to the variant shown in FIG. 1, into an illuminating beam 4 and a reference beam 5. An object 19 to be holographed carries on its side remote from the hologram plate 9 a small mirror 20, ahead of which is arranged a collecting lens 11 whose axis is parallel to the angle bisector 12 between the axis 13 of the fanned-out illuminating beam and the mean direction 14 of the rays of the object light striking the hologram plate 9.

The illuminating beam 4 split off on the divider plate 3 is deflected on a mirror 21 in the direction of the object 19 and focussed in the collecting lens 11 on the mirror 20. After reflection on the mirror 20, the beam is colliminated again in the same collecting lens 11 and, after deflection on the mirrors 22, 23 and 24, fanned out in a microscope objective 25 to illuminate the object 19. The reference beam 5, after being deflected on the mirror 26 and fanned out in a second microscope objective 27, impinges on the hologram plate 9 on which the rays of the reference beam interfere with those of the object light for the formation of the hologram.

As it can be readily seen, the difference of the mean path lengths of the rays of the illuminating beam and of the object light, on the one hand, and of the reference beam, on the other hand, remains likewise substantially constant during a movement of the object in the direction of the above mentioned angle bisector 12, similar to the conditions in the variant according to FIG. 1.

I claim:

1. In the method for producing a hologram of a movable object having an arbitrary shape and reflecting quality wherein a beam for illuminating the object and a reference beam are produced from the same monochromatic light source, the reference beam interfering in a hologram plate with scatter light reflected from the object for formation of a hologram, the improvements wherein said light source is constituted by a light beam having a small aperture angle, said beam being split by a divider plate into the object illuminating beam and reference beam and which are fanned out to illuminate the object and hologram plate respectively, and wherein for compensating for movement of the object in the direction of the angle bisector between the axis of the object illuminating beam and the mean direction of the scatter light reaching to the hologram plate a mirror is mounted on the object and one of said beams is conducted over said mirror such that the difference between the mean path lengths of the object illuminating beam and of the object light, on the one hand, and that of the reference beam, on the other hand, remains substantially constant during the exposure, said beam which is conducted over said mirror being focussed thereon by means of a collecting lens whose optical axis is substantially parallel to the said direction of movement of the object, and said beam being collimated again in the same collecting lens.

2. The method as defined in claim 1 for producing a hologram of an object having an arbitrary shape and reflecting quality wherein the mirror mounted on the object is located on the side of the object facing the hologram plate and wherein the reference beam is conducted over the mirror.

3. The method as defined in claim 1 for producing a hologram of an object having an arbitrary shape and reflecting quality wherein the mirror mounted on the object is located on the side of the object remote from the hologram plate and wherein the object illuminating beam is conducted over the mirror.

* * * * *